United States Patent [19]
Iwatsu et al.

[11] Patent Number: 5,693,430
[45] Date of Patent: Dec. 2, 1997

[54] NONAQUEOUS ELECTROLYTIC SECONDARY BATTERY

[75] Inventors: Satoshi Iwatsu, Tokyo; Tatsuo Shimizu; Hideya Takahashi, both of Koriyama; Yosuke Kita, Tokyo; Kiyoshi Katayama, Koriyama; Etsuo Ogami, Kanagawa-ken, all of Japan

[73] Assignee: Nissan Motor Co., Ltd., Yokohama, Japan

[21] Appl. No.: 714,535

[22] Filed: Sep. 16, 1996

[30] Foreign Application Priority Data

Sep. 27, 1995 [JP] Japan .................. P07-249942

[51] Int. Cl.⁶ .................................................. H01M 2/36
[52] U.S. Cl. .................. 429/72; 429/80; 429/89; 429/185; 429/218

[58] Field of Search ............... 429/72, 73, 80, 429/89, 185, 218

Primary Examiner—Prince Willis, Jr.
Assistant Examiner—Jonathan S. Krueger
Attorney, Agent, or Firm—Foley & Lardner

[57] ABSTRACT

A nonaqueous electrolytic secondary battery has a seal whose transparency and permeability with respect to external gas or moisture can be suppressed to a low level and which has high reliability. The nonaqueous electrolytic secondary battery has an electrolytic solution injection port (32) for injecting a nonaqueous electrolytic solution and an expansion plug (4) for air-tightly sealing the electrolytic solution injection port. A metal seal (2) is arranged between the electrolytic solution injection port (32) and the expansion plug (4). The metal seal (2) is of a metal containing aluminum as a main component, or a stainless steel, and the expansion plug (4) is of stainless steel.

10 Claims, 4 Drawing Sheets

5,693,430

NONAQUEOUS ELECTROLYTIC SECONDARY BATTERY

BACKGROUND OF THE INVENTION

1. Field of the Invention

The present invention relates to a secondary battery preferably applied as a large-size battery such as a main power source of electric vehicle having a large electric capacity.

2. Description of Related Art

A small-size nonaqueous electrolytic secondary battery for an AV, the battery can be sealed with a crimp structure. For this reason, a means in which crimping is performed after an electrolytic solution is contained in the battery is employed.

However, when the crimp structure is employed in a large-size nonaqueous electrolytic secondary battery, the thickness of a battery vessel must be increased as increase in diameter of the nonaqueous electrolytic secondary battery to keep the holding power in the crimp structure. Therefore, since the crimp structure is disadvantage as a product in consideration of a weight energy density, a crimp sealing scheme is not used, and a sealing scheme such as a laser welding scheme is popularly used.

However, in use of such a welding scheme, an expensive head is exposed to an electrolytic vapor atmosphere, the service life of the head is disadvantageously shortened. Therefore, the electrolytic solution is preferably poured in the battery after welding.

As an inexpensive seal, a rubber seal is used. However, in an organic-solvent-based battery such as a lithium-ion secondary battery, an electrolytic solution dissolves or expands the rubber. For this reason, the type of rubber seal cannot be easily selected, and an expensive rubber of fluoroelastomers, e.g., perfluororubber must be disadvantageously used.

SUMMARY OF THE INVENTION

The present invention has been made in consideration of the above problem, and its object is to provide a nonaqueous electrolytic secondary battery having a seal whose transparency and permeability with respect to external gas or moisture can be suppressed to a low level and which has high reliability.

According to the present invention, there is provided an nonaqueous electrolytic solution comprising: an electrolytic solution injection port for injecting a nonaqueous electrolytic solution; and an expansion plug for air-tightly sealing the electrolytic solution injection port; wherein a metal seal is arranged between the electrolytic solution injection port and the expansion plug.

The nonaqueous electrolytic secondary battery according to the present invention has the above arrangement in which the metal seal is made of a metal containing aluminum as a main component or stainless steel.

The nonaqueous electrolytic secondary battery according to the present invention has the above arrangement in which an expansion plug is made of stainless steel.

The nonaqueous electrolytic secondary battery according to the present invention is a lithium-ion secondary battery having the above arrangement.

According to the nonaqueous electrolytic secondary battery of the present invention, a metal seal is arranged between the electrolytic solution injection port and the expansion plug to suppress the transparency and permeability with respect to external gas or moisture.

DETAILED DESCRIPTION OF THE PREFERRED EMBODIMENT

A nonaqueous electrolytic secondary battery according to an embodiment of the present invention will be described below with reference to FIGS. 1 to 4.

Figure 1:
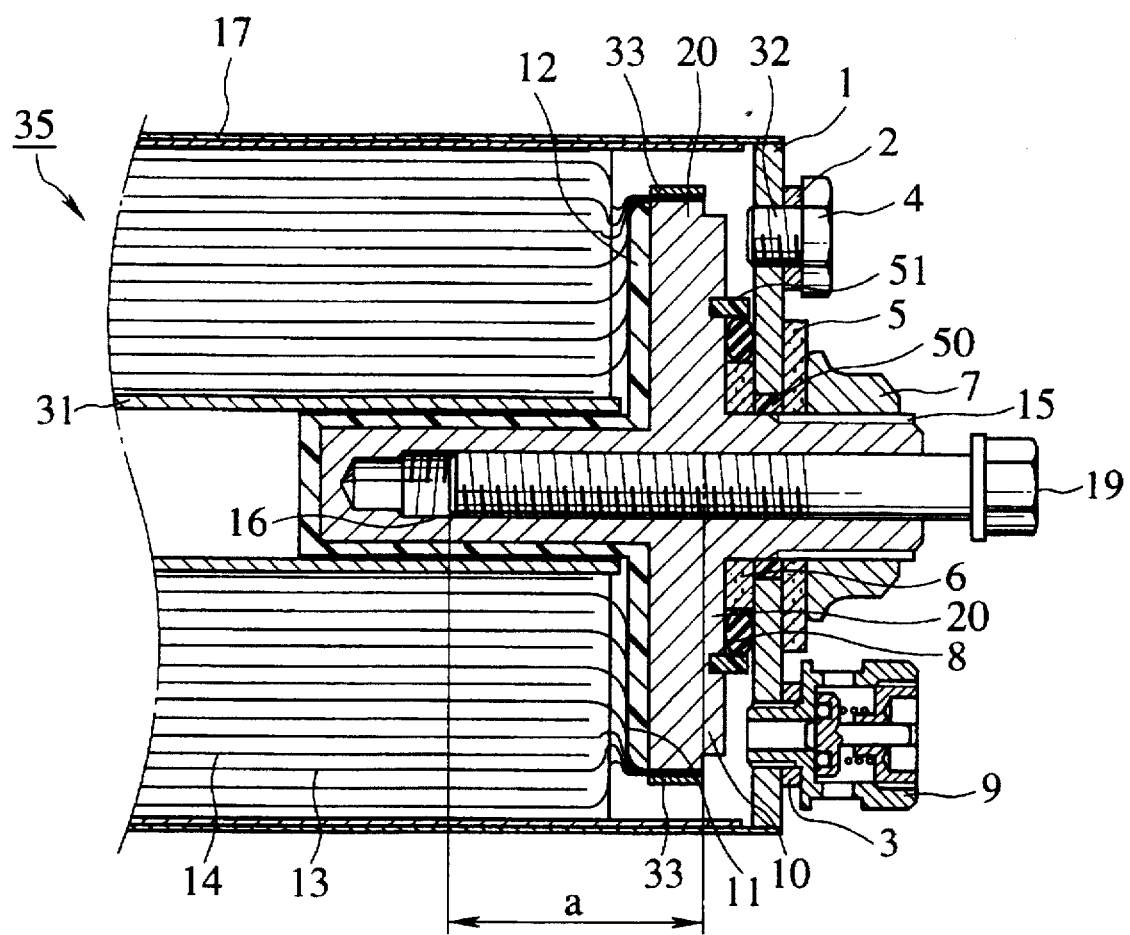
FIG. 1 is a sectional view showing a main part of a nonaqueous electrolytic secondary battery according to an embodiment of the present invention.
Figure 2:
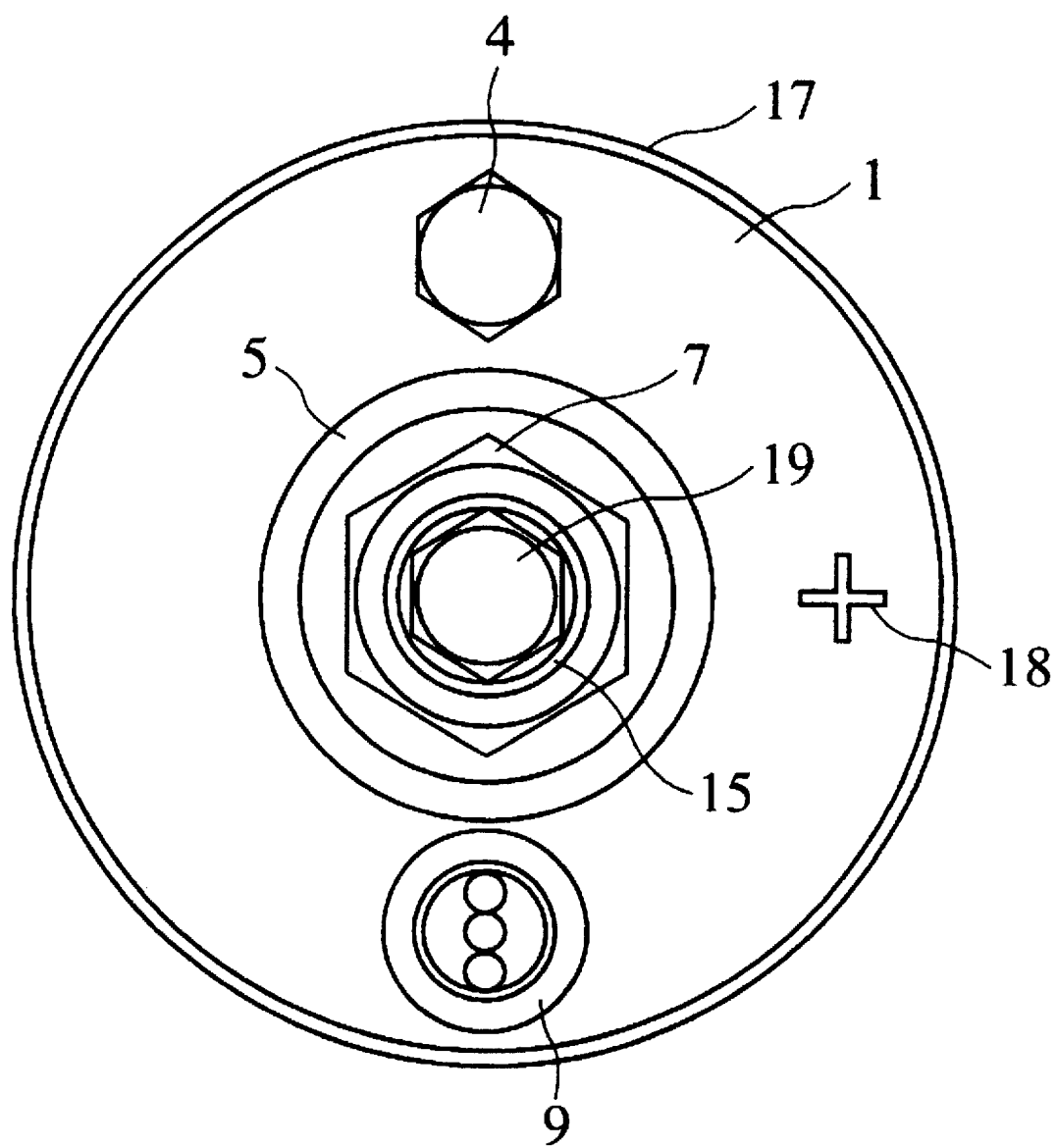
FIG. 2 is a side view showing a main part of the nonaqueous electrolytic secondary battery according to the embodiment of the present invention.
Figure 3:
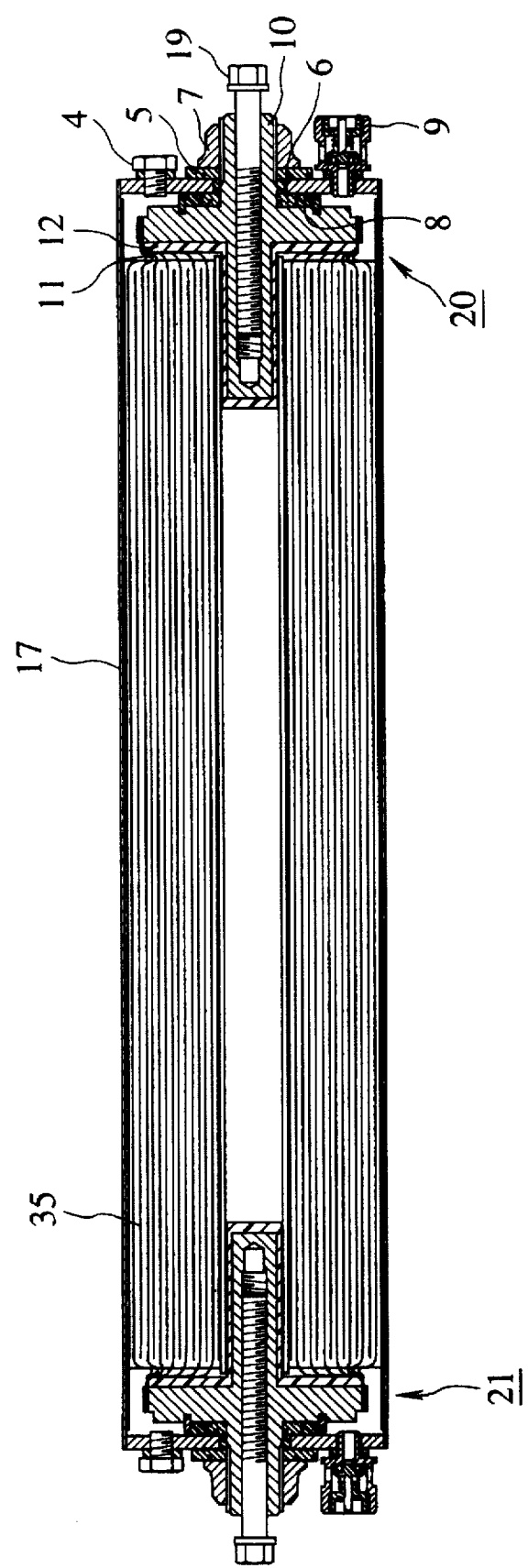
FIG. 3 is a sectional view showing the entire arrangement of the nonaqueous electrolytic secondary battery according to the embodiment of the present invention.

FIGS. 1 and 2 are sectional and side view showing a main part of a lithium-ion secondary battery according to this embodiment. FIG. 3 briefly shows the entire arrangement of the lithium-ion secondary battery of this embodiment.

In this embodiment, as shown in FIG. 3, an electrode spiral member 35 is stored in a cylindrical battery vessel 17. The electrode spiral member 35, as shown in FIG. 1, is constituted such that a thin-film negative electrode 14 and a thin-film positive electrode 13 are wound on a spindle 31 through separators 30.

In this case, a method of fabricating the negative electrode 14 will be described below.

As an active material of the negative electrode 14, a carbon material powder having an average grain size of 20 μm and prepared as follows is used. 10 to 20% by weight of a functional group containing oxygen are added (so-called bridge formation) to petroleum pitch serving as a start material. The resultant material is heat treated at 1,000° C. in inert gas flow to obtain a carbon material having properties close to those of glass-like carbon. The carbon material is ground.

90% by weight of the carbon material powder is mixed with 10% by weight of polyvinylene fluoride (PVDF) serving as a binder, and the mixture is dispersed in a solution (N-methyl pyrolidone) to form a slurry-like material. The slurry-like negative active material is uniformly coated on both the surfaces of a negative current collector consisting of a thin-film copper foil having a thickness of 10 μm to fabricate a negative electrode original plate having a thickness of 180 μm, and the negative electrode original plate is cut in the form of a belt except for an uncoated portion serving as the lead portion of the negative electrode on the side portion. The shape of the negative electrode 14 has a width of 383 mm which includes a 348 mm coated portion and a 35 mm uncoated portion. The length of the negative electrode 14 is 6,940 mm.

The positive electrode 13 is fabricated in the following manner.

More specifically, 91% by weight of LiCoO$_2$ powder having an average grain size of 15 μm, 6% by weight of graphite serving as a conductive agent, and 3% by weight of polyvinylidene fluoride serving as a binder are mixed with each other, and this mixture is dispersed in a solution (N-methyl pyrolidone) to form a slurry-like material. The slurry-like positive active material is uniformly coated on both the surfaces of a positive current collector consisting of a thin aluminum foil having a thickness of 20 μm to fabricate a positive electrode original plate having a thickness of 150 μm, and the positive electrode original plate is cut in the form of a belt except for an uncoated portion serving as the lead portion of the positive electrode on the side portion. The shape of the negative electrode 14 has a width of 379 mm which includes a 344 mm coated portion and a 35 mm uncoated portion. The length of the positive electrode is 7,150 mm.

The uncoated portions of the positive and negative electrodes 13 and 14 fabricated as described above are cut at a pitch of 15 mm in the form of stripes each having a width of 10 mm and a length of 30 mm, thereby obtaining stripe-like leads. In this case, the uncoated portions of the positive electrode 13 and the negative electrode 14 are entirely cut to have the above dimensions.

In this case, each stripe-like lead 11 must have a length between the electrode end and the pole 10. The width of the stripe-like lead 11 is set such that the total sectional area of the stripe-like lead 11 satisfies the maximum energizing current value. In consideration of the bending properties of the stripe-like lead 11, the width of the stripe-like lead 11 is preferably set to be 10 mm or less.

Figure 4:
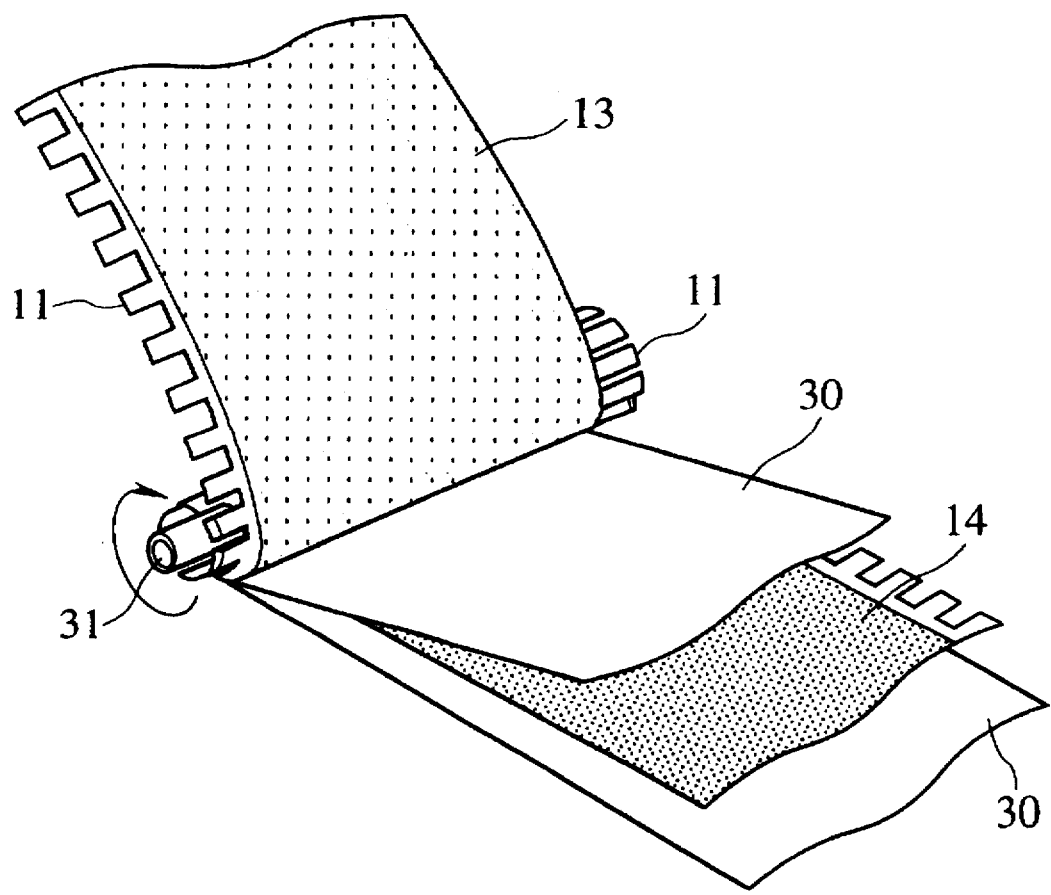
FIG. 4 is a perspective view showing a winding method of the positive and negative electrodes of the nonaqueous electrolytic secondary battery.

As shown in FIG. 4, the positive electrode 13, the negative electrode 14, and the separators 30 are stacked in the order of the positive electrode 13, the separator 30, the negative electrode 14, and the separator 30, and wound on the spindle 31, thereby forming the electrode spiral member 35. At this time, in the electrode spiral member 35, the positive electrode 13 and the negative electrode 14 are wound such that the stripe-like leads 11 of the positive electrode 13 are gathered on one side of the electrode spiral member 35 and the stripe-like leads 11 of the negative electrode 14 are gathered on the other side of the electrode spiral member 35.

Each separator 30 is a polyethylene sheet which is cut to have a size of 353×7,600 mm and a thickness of 38 μm and in which fine holes are formed.

The electrode spiral member 35 is a pure-aluminum cylinder having, e.g., an outer diameter of 17 mm, an inner diameter of 14 mm, and a length of 354 mm.

The stripe-like leads 11 are extracted from both the sides of the spindle 31 of the electrode spiral member 35 as described above, a current obtained by the electrode current collector can be rapidly extracted. In addition, since the stripe-like leads 11 are formed in the form of narrow-short stripes, the stripe-like leads 11 can be easily deformed, and can be welded along the outer peripheral portion of the disk-like portion of the pole 10.

After the positive electrode 13, the negative electrode 14, and the separators 30 are wound on the spindle 31, as shown in FIG. 1, the stripe-like leads 11 are pressed on the entire circumference of the outer peripheral portion of the disk-like portion of the pole 10 by pressure metal fittings 33.

In the pole 10, pure aluminum (A1050) is used as the material of the positive electrode, and pure copper (C1100) is used as the material of the negative electrode. In the pressure metal fittings 33, pure aluminum (A1050) is used as the material of the positive electrode, and pure copper (C1100) is used as the material of the negative electrode.

The stripe-like leads 11 are pressed on the outer peripheral portion of the disk-like portion of the pole 10 by the pressure metal fittings 33, and then the stripe-like leads 11 are cut at the upper end face of the disk-like portion of the pole 10. Thereafter, a laser beam is irradiated on the upper surface of the disk-like portion of the pole 10 to weld the stripe-like leads 11 to the entire circumference of the disk-like portion.

In this manner, since the stripe-like leads 11 extracted from the electrode current collector are welded to the pole 10 such that the stripe-like leads 11 are joined to the pole 10 with a large area, a low internal resistance can be obtained, and a variation in internal resistance is small. In addition, because of the large area, a battery having excellent large-current discharge characteristics can be obtained.

The electrode spiral member 35 and the pole 10 which are welded to each other incorporate a backup ring 51, a seal 8, a ceramic patch 6, a cap (lid) 1, a ring 50, and a ceramic washer 5, and are fastened by a nut 7.

Thereafter, as shown in FIG. 1, the outer periphery of the cap 1 is pressure-inserted into the battery vessel 17 and welded by a laser. More specifically, a laser beam is irradiated from the upper surface of the cap 1 onto the circumference of the cap 1 to weld the cap 1 to the battery vessel 17, thereby air-tightly sealing the battery vessel 17.

In this manner, when the cap 1 of the battery vessel 17 is welded by the laser, a battery having a completely air-tight structure can be obtained.

The material of the battery vessel 17 is stainless steel (SUS304), and the thickness of the battery vessel 17 has the range of 0.3 to 0.5 mm. The material of the cap 1 is stainless steel (SUS304), and the thickness of the cap 1 is 3 mm.

As is apparent from FIG. 1, a male screw (male screw portion 15) of M14 is formed outside the distal end portion of the positive pole 10. The nut 7 is fitted on the male screw portion 15. When the nut 7 is fastened, the cap 1 is interposed between the ceramic washer 5 and the ceramic patch 6 to fix the pole 10 itself to the cap 1. The seal 8 is interposed between the disk-like portion of the pole 10 and the cap 1, so that the pole 10 is air-tightly sealed to prevent the inner electrolytic solution from leaking.

A female screw (female screw portion 16) of M6 is formed in the central portion of the positive pole 10. The female screw portion 16 is used when wiring with an external circuit. More specifically, a bolt 19 is meshed with the female screw portion 16 to interpose a bus bar or a conductive line between the end surface of the distal end of the pole and the head portion of the bolt 19, thereby connecting and fixing the bus bar or the conductive line.

In this case, when the female screw portion of M6 is arranged outside the distal end portion of the pole 10, i.e., at a level equal to that of the male screw portion 15 of M14, force acts in the external direction when the bolt is fastened to the female screw portion of M6. Therefore, when the female portion of M6 is fastened or loosened many times, influence acts on a fastening force of the nut 7 to the male screw portion of M14.

For this reason, the distance between the end face of the distal end portion of the pole 10 to the upper end of the female screw portion 16 is set to be 20 mm in consideration of a margin from the end of the male screw portion 15.

The female screw portion 16 of M6 is used to fix a bus bar or a conductive line to the pole 10 to extract current energy. When the female screw portion 16 is incompletely attached, a contact failure dangerously occurs. In particular, when the battery is mounted on an automobile as an electric automobile secondary battery, the battery must withstand vibration, and strong fastening force is required.

In this embodiment, the base material of the female screw portion 16 of the positive electrode is pure aluminum (A1050). In order to keep the fastening force of the bolt 19 equal to that of the base material of the stainless base, shearing force acting on one screw thread must be decreased, and the number of screw threads must be increased. For this reason, the length of the female screw portion 16 must be increased.

A required length of the female screw portion 16 was calculated in an experiment.

As a result, the following findings could be obtained. That is, in order to keep the strength of the female screw of M6 equal to that of the base material of a stainless steel bolt, a meshing length a was necessarily set is larger than 15 mm.

Since the lithium ion secondary battery of this embodiment has a large capacity, when the battery is constituted by a cylindrical battery, both the diameter and the length of the cylinder are large. In this case, the spindle 31 itself must be increased in size to some extent to assure its rigidity.

For this reason, the spindle 31 arranged at the center portion can be increase in size to have an outer diameter of 17 mm, and the female screw portion 16 of M6 can be stored in the space inside the spindle.

Therefore, according to this embodiment, when the female screw portion 16 of M6 and the electrode winding portion are caused to overlap, a volume energy density can be considerably increased.

As shown in FIG. 1, the spindle 31 is insulated from the pole 10 by an insulating collar 12 consisting of polypropylene (PP).

As shown in FIGS. 1 and 2, the ceramic washer 5 has a disk-like shape having a circular hole at its center, and is interposed between the nut 7 and the cap 1. The material of the ceramic washer 5 is alumina ($Al_2O_3$).

Although the ceramic washer 5 is used to insulate the pole 10 from the cap 1, the ceramic washer 5 consists of alumina, thereby assuring insulating properties.

Since the pole 10 is fixed to the cap 1 by fastening the nut 7, the ceramic washer 5 must have rigidity to sufficiently withstand the fastening force, i.e., a compression force. With respect to this point, the ceramic washer 5 consists of alumina, the ceramic washer 5 can sufficiently withstand the compression force caused by the nut 7. In addition, since the material of the ceramic washer 5 is alumina, the ceramic washer 5 does not change in shape a long period of time after fastening. For this reason, strong fastening force can be maintained.

Since alumina does not change in rigidity with respect to a change in temperature, the fastening force can be maintained even if temperature changes in a wide range.

Since alumina has very high rigidity, the nut 7 can be more strongly fastened. As a result, strong fastening force can be obtained, the nut 7 is not loosened with time due to vibration generated when the battery is mounted on an automobile, and sufficient sealing properties can be obtained. Therefore, air-tightness can be held such that a nonaqueous electrolytic solution can be prevented from leaking.

The ring 50 is arranged between the ceramic washer 5 and the ceramic patch 6 and between the inside of the cap 1 and the outside of the pole 10. The ring 50 has a rectangle as a sectional shape, and consists of a polymer material such as PP. The ring 50 is used to hold the central axis of the pole 10 is kept at the central axis of the battery in the longitudinal direction when the pole 10 is fixed to the cap 1.

The ceramic patch 6 is interposed between the inner surface of the cap 1 and the disk-like portion of the pole 10. This ceramic patch 6 has a disk-like shape having a circular hole at its center like the ceramic washer 5, and consists of alumina ($Al_2O_3$).

The ceramic patch 6 is used like the ceramic washer 5 to assure the insulating properties between the pole 10 and the cap 1.

The ceramic patch 6 can sufficiently withstand the compression force caused by the nut 7. The ceramic patch 6 can maintain strong fastening force a long period of time after fastening.

The fastening force of the ceramic patch 6 can be maintained even if a temperature changes in a wide range.

The ceramic patch 6 can obtain strong fastening force, the nut 7 is not loosened with time due to vibration generated when the battery is mounted on an automobile, and sufficient sealing properties can be obtained. Therefore, a nonaqueous electrolytic solution can be prevented from leaking.

Furthermore, the size of the outer periphery of the ceramic patch 6 is set at a position where elastic deformation of the seal 8 does not occur to some extent or more, so as to prevent large elastic deformation of the seal 8. As a result, the reaction force of the seal 8 in the axial direction of the pole 10 can be increased. When the ceramic patch 6 is arranged as described above, the sealing force of the seal 8 can be increased to a sufficient high level.

The backup ring 51 is arranged on the outer periphery of the seal 8 to be in contact with the seal 8. The backup ring 51 consists of PP.

The backup ring 51 prevents the seal 8 from being deformed when the seal 8 is brought into contact with the nonaqueous electrolytic solution present in the battery, expands, and deformed, thereby preventing the reaction force of the seal 8 in the axial direction of the pole 10 from being decreased.

As shown in FIGS. 1 and 2, an opening valve unit 9 is arranged at a position outside the center of the cap 1. The opening valve unit 9 is fixed to the hole formed in the cap 1 by a screw manner.

The opening valve unit 9 is used to discharge the internal gas out of the vessel when the internal pressure of the battery vessel increases.

Valves arranged in the opening valve unit 9 is pressed against the inside of the battery by a spring to keep the liquid-tightness in the battery.

When the internal pressure in the battery increases due to any cause, the valves in the opening valve unit 9 are pressed against the outside of the battery. As a result, the gas in the battery is discharged out of the vessel through a gap formed by moving the valves and through a hole formed in the side surface of the opening valve unit 9. Because the opening valve unit 9 is arranged, even if the internal pressure increases, the pressure can be prevented from exceeding a predetermined pressure.

As shown in FIG. 1, an electrolytic solution injection port 32 is arranged at a position outside the center of the cap (lid) 1. A female screw of M16 is formed in the inner side surface of the electrolytic solution injection port 32. The electrolytic solution injection port 32 is used to inject the electrolytic solution into the battery after the battery structure is assembled.

As shown in FIGS. 1 and 2, an expansion plug 4 is arranged at the position of the electrolytic solution injection port outside the center of the cap 1. The expansion plug 4 is fixed to the electrolytic solution injection port 32 of the cap 1 in a screw manner. The expansion plug 4 is fastened in the electrolytic solution injection port 32 by a screw manner through a metal seal 2 to air-tightly seal the battery vessel.

The metal seal 2 is interposed between the head portion of the expansion plug 4 and the surface of the cap 1. The sectional shape of the metal seal 2 is a rectangular ring, and the metal seal 2 consists of pure aluminum or stainless steel.

The metal seal 2 may consist of not only pure aluminum or stainless steel, but also other metals.

On the other hand, metal portions being in contact with the metal seal 2 correspond to the cap 1 of the battery and the head portion of the expansion plug 4, and consist of stainless steel (SUS304). The surfaces of the metal portions being in contact with the metal seal 2 is subjected to surface polishing to be smoothed.

The following finding could be obtained. That is, even if two types of metals, i.e., stainless steel and pure aluminum were brought into contact with each other and brought into contact with the nonaqueous electrolytic solution of the battery of this embodiment, the potential between metals immediately reached an equilibrium level. Therefore, the following was confirmed. That is, ion exchange between the metals was small, and corrosion did not progress.

As described above, according to this embodiment, when the metal seal consisting of pure aluminum or stainless steel is used, the transparency and permeability with respect to external gas or moisture can be suppressed to a level lower than that of a seal consisting of a polymer material such as a rubber material, and the service life of the battery can be prolonged.

Although a seal consisting of a polymer material which does not expand and dissolved in a nonaqueous electrolytic solution is expensive, pure aluminum or stainless steel has a price lower than that of the polymer material. Therefore, when the metal seal is used, a reduction in cost can be obtained.

The pure aluminum or stainless steel material has a service life longer than that of the polymer material. For this reason, when the metal seal is used as a seal for the expansion plug, the metal seal can be used almost indefinitely, and the seal need not be exchanged.

Since the seal consisting of pure aluminum or stainless steel has heat resistance higher than that of a seal consisting of a polymer material, the reliability of the seal can be improved by using the metal seal.

As shown in FIG. 1, a metal seal can be used as the seal for the opening valve unit 9 for releasing pressure when the internal pressure of the battery increases. The metal seal can be applied in a wide range.

A method of injecting a nonaqueous electrolytic solution into the battery vessel will be described below.

An injection attachment is screwed in the electrolytic solution injection port 32 to be fixed. In this manner, the nonaqueous electrolytic solution stored in an electrolytic tank (EL) communicates with the battery vessel. A space portion higher than the level of the nonaqueous electrolytic solution in the electrolytic solution tank communicates with a vacuum pump through a switching valve.

The vacuum pump is operated. When the vacuum pump is operated, air in the battery is discharged out of the battery vessel, the internal pressure of the battery vessel is lower than the atmospheric pressure.

The switching valve arranged between the vacuum pump and the electrolytic solution tank is switched to expose the liquid surface of the electrolytic solution tank to the atmospheric air. At this time, the pressure in the tank becomes higher than that in the battery vessel, and the nonaqueous electrolytic solution in the tank is pressed out to be inserted in the battery vessel.

When the above process is repeated some times, the predetermined nonaqueous electrolytic solution can be injected in the battery vessel.

Upon completion of injection of the nonaqueous electrolytic solution, the battery vessel must be sealed to prevent the electrolytic solution from being out of the battery. For this reason, the expansion plug 4 is screwed in the electrolytic solution injection port 32 through the metal seal 2 to be fastened, thereby air-tightly sealing the battery vessel.

The present invention is not limited to the embodiment described above, and various arrangements can be effected without departing from the spirit and scope of the present invention as a matter of course.

As has been described above, according to the present invention, the transparency and permeability with respect to external gas or moisture can be suppressed to a level lower than that of a seal consisting of a polymer material such as a rubber material, and the service life of the battery can be increased.

Pure aluminum has a price lower than that of the polymer material. Therefore, when a metal seal consisting of pure aluminum is used, a reduction in cost can be obtained.

The pure aluminum or stainless steel material has a service life longer than that of the polymer material. For this reason, the metal seal can be used almost indefinitely, and the seal need not be exchanged.

Since the seal consisting of pure aluminum has heat resistance higher than that of a seal consisting of a polymer material, the reliability of the seal can be improved.

A metal seal can also be used as the seal for the opening valve unit or the like.

What is claimed is:

1. A nonaqueous electrolytic secondary battery comprising:
   an electrolytic solution injection port for injecting a nonaqueous electrolytic solution; and
   an expansion plug for air-tightly sealing said electrolytic solution injection port;
   wherein a metal seal is arranged between said electrolytic solution injection port and said expansion plug.

2. A nonaqueous electrolytic secondary battery according to claim 1, wherein said metal seal comprises a metal consisting essentially of either aluminum or stainless steel.

3. A nonaqueous electrolytic secondary battery according to claim 2, wherein said expansion plug consists essentially of stainless steel.

4. A nonaqueous electrolytic secondary battery according to claim 3, wherein said nonaqueous electrolytic secondary battery is a lithium-ion secondary battery.

5. A nonaqueous electrolytic secondary battery according to claim 1, wherein said metal seal comprises aluminum.

6. A nonaqueous electrolytic secondary battery according to claim 1, wherein said metal seal comprises stainless steal.

7. A nonaqueous electrolytic secondary battery according to claim 1, wherein said expansion plug comprises stainless steel.

8. A nonaqueous electrolytic secondary battery according to claim 1, wherein said nonaqueous electrolytic secondary battery is a lithium-ion secondary battery.

9. A nonaqueous electrolytic secondary battery according to claim 1, wherein said metal seal consists of aluminum.

10. A nonaqueous electrolytic secondary battery according to claim 1, wherein said metal seal consists of stainless steel.

* * * * *